United States Patent [19]

England

[11] 4,135,688

[45] Jan. 23, 1979

[54] ANTI-TILTING RESILIENT SUPPORT SYSTEM FOR AIMED AIRBORNE POD-ENCLOSED SENSOR INSTRUMENTS

[75] Inventor: Forrest E. England, Severna Park, Md.

[73] Assignee: Westinghouse Electric Corp., Pittsburgh, Pa.

[21] Appl. No.: 800,663

[22] Filed: May 26, 1977

[51] Int. Cl.² .......................... F16F 7/00; F16F 9/346
[52] U.S. Cl. .................................. 248/604; 248/610
[58] Field of Search ............... 248/18, 358 R; 280/104

[56] References Cited

U.S. PATENT DOCUMENTS

| | | | |
|---|---|---|---|
| 1,075,415 | 10/1913 | Guillery | 280/104 |
| 1,313,167 | 8/1919 | Cosgrove | 280/104 |
| 2,684,254 | 7/1954 | Goss | 280/112 A |
| 2,704,196 | 3/1955 | Beach | 248/358 R |
| 2,840,387 | 6/1958 | Orlandi | 280/104 |
| 3,184,208 | 5/1965 | Tanaka | 248/429 |
| 3,186,730 | 6/1965 | Angell | 280/104 |
| 3,288,541 | 11/1966 | Tracy | 308/2 A |
| 3,328,019 | 6/1967 | Wilson | 267/11 A |
| 3,823,903 | 7/1974 | Kendall et al. | 248/18 |
| 3,946,976 | 3/1976 | Radford | 248/18 |

FOREIGN PATENT DOCUMENTS 1,362,687  4/1964  France.

Primary Examiner—J. Franklin Foss
Attorney, Agent, or Firm—D. F. Straitiff

[57] ABSTRACT

The system includes a number of cables and pulleys arranged to prevent vertical and sidewise tilting of the sensor mounting structure (SMS) about a transverse axis while affording a useful limited degree of vertical and sidewise translational freedom for resilient vibration-isolating support. The cable and pulley arrangement extends from end to end of the SMS in a narrow radial clearanceway between the SMS and an elongated cylindrical pod housing to be affixed to an aircraft for disposition at its exterior.

3 Claims, 9 Drawing Figures

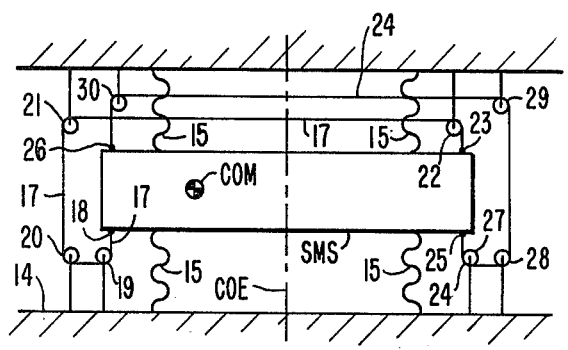
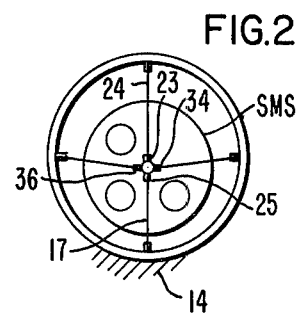
FIG.1
FIG.2
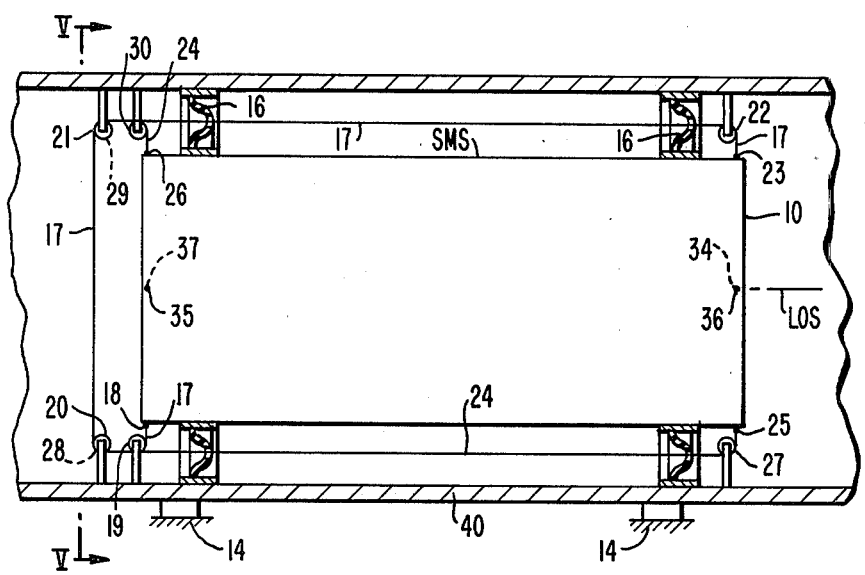
FIG.3
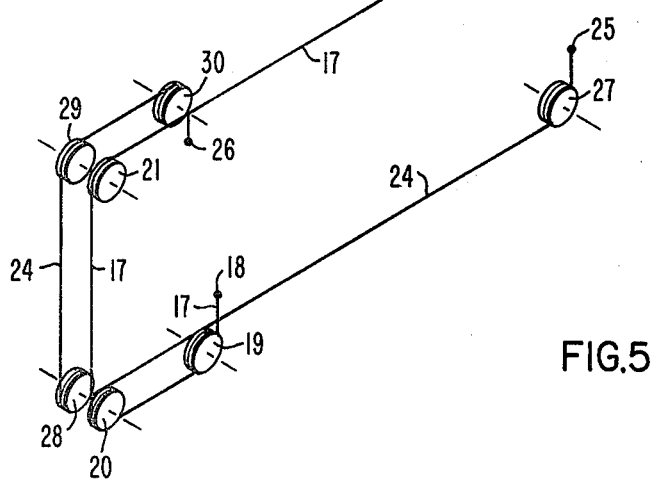
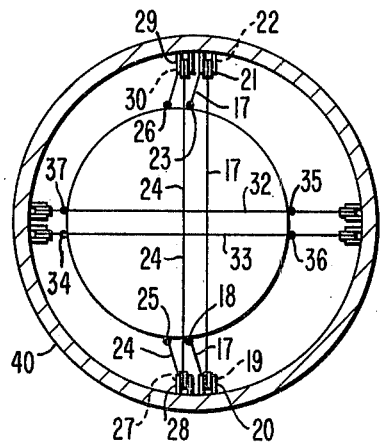
FIG.4
FIG.5

ANTI-TILTING RESILIENT SUPPORT SYSTEM FOR AIMED AIRBORNE POD-ENCLOSED SENSOR INSTRUMENTS

BACKGROUND OF THE INVENTION

The invention herein described was made in the course of or under a contract or subcontract thereunder, with the United States Department of the Air Force.

FIELD OF THE INVENTION

Vibration isolated aimed airborne sensor instruments.

DESCRIPTION OF THE PRIOR ART

Airborne electro-optical sensor instruments, such as those employing laser radar, for example, generally include an input optics aimable along a line of sight (LOS) for directing optical information to a sensor means, both disposed in an elongated sensor mounting structure (SMS) mounted for vibration isolation within an elongated pod housing member disposed at the exterior of the aircraft. Translational vibration of the SMS from side to side or up and down has little if any deleterious effect on the aim of the input optics with respect to the LOS, while tilting of the SMS up and down or from side to side about a lateral axis tends to disturb the aim of the input optics relative to the LOS. Where the vibration isolation system for the SMS is a passive one, as is desired in behalf of simplicity, and the center of mass for the SMS does not coincide longitudinally with respect to the center of elasticity for the SMS, translational vibratory movement of the pod housing relative to the SMS, from side to side or up and down, or both, can introduce a differential between resilient support forces in the vibration-isolating mounting means, such that a forward or sideward tilting, is introduced to the SMS. To prevent such tilting while at the same time affording freedom for relative transverse vibratory movement between the housing support and the SMS, it has been proposed heretofore as in U.S. Pat. No. 3,946,976 to Radford to provide an arrangement of sheathed cables interconnecting opposite ends of an SMS, for example, to permit the freedom for translational vertical or sidewise movement while preventing or suppressing the aforementioned tilting. Several patents, U.S. Pat. No. 2,704,196 and French Pat. No. 1,362,687 provide for such anti-tilting translational freedom by use of a system of pivotally connected linkages. A number of U.S. Pat., No. 3,328,019 to Wilson; No. 3,186,730 to Angell; and No. 2,684,254 to Goss, disclose hydraulic systems employing an arrangement of double acting cylinders in automobile suspension systems for preventing tilting or swaying of the vehicle body.

SUMMARY OF THE INVENTION

The present invention in utilizing a system of cables and pulleys to prevent or suppress tilting movement of an airborne resiliently supported sensor mounting structure affords an opportunity for making such anti-tilting system lightweight and compact, as is desirable for airborne use. When disposed in a cylindrical aircraft pod, such construction enables the diameter of such pod to be of minimal size, and of minimal air friction characteristics. In other words, the drag of such pod created during its high speed passage through the air with movement of the aircraft in which it is mounted can be minimized. At the same time, the anti-tilting cable and pulley arrangement of the present invention is believed to be capable of performing its function in a superior manner.

BRIEF DESCRIPTION OF THE DRAWINGS

FIG. 1 is a side elevation view of a schematic representation of one embodiment of the present invention;

FIG. 2 is an end view showing schematically certain functional relationships between components of the cable and pulley anti-tilting system as the same might exist in an alternate construction of the invention;

FIG. 3 is a schematic representation of yet another illustrative embodiment of the present invention as affiliated by way of example with a cylindrical pod housing particularly adapted for external mounting on an aircraft;

FIG. 4 is an isometric three-dimensional view of a cable and pulley arrangement embodied in the system of FIG. 3 for preventing or reducing tilting of the sensor mounting structure (SMS) vertically;

FIG. 5 is an end view taken along the section line V—V in FIG. 3 which depicts, exaggeratedly, certain positional relationships between cable components embodied in the FIG. 3 construction;

DESCRIPTION OF THE PREFERRED EMBODIMENTS

Figure 6:
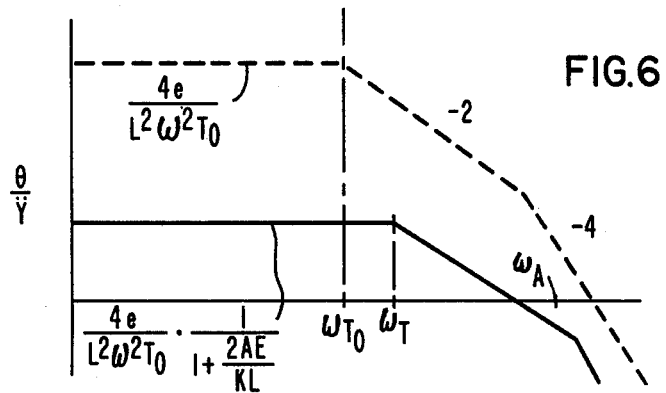
FIG. 6 sets forth a pair of curves depicting the tilt output transfer functions for a vibration isolated SMS with and without, respectively, the anti-tilting cable system of the present invention.

The present invention is affiliated with a sensor mounting structure, hereinafter referred to as an SMS, which includes an optical sensor, not shown, responsive to optical information and an input optics end 10 for observation of information along the line of sight (LOS) for transmission internally of the SMS to the aforementioned sensor. The SMS is elongated and simplistically has been shown in cylindrical configuration, of circular cross-section, but it will be appreciated that other configurations also may apply, such as of rectangular cross-section and/or variegated shape from one end to the other. The present system is intended for airborne use and may be of the electro-optical type such as involves transmission and reception of laser radar pulses as well as picture information for a TV camera along the LOS. The SMS is resiliently supported for vibration isolation from the supporting structure 14 through the medium of a plurality of helical compression springs 15 as in FIG. 1 or an arrangement of annular rings 16 of resilient material as in FIG. 3. It is intended that by virtue of the resilient support means 15 and 16 in FIGS. 1 and 3, the supporting structure 14 may vibrate translationally, i.e. up-and-down or left-to-right without any significant corresponding vibration of the SMS; it being appreciated, however, that translation of the SMS does not tend to spoil its aim with respect to the line of sight, LOS, while tilting movement of the SMS does.

Figure 7:
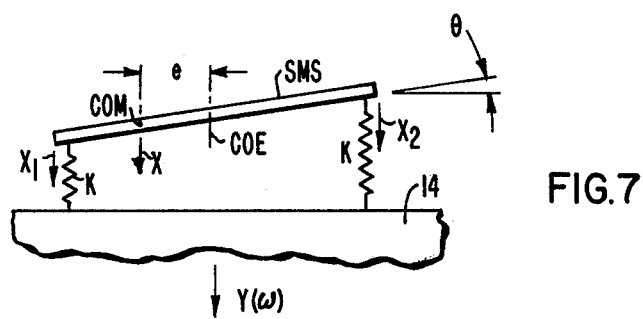
FIGS. 7 and 8 are diagrams depicting relationships between transverse vibration of an SMS and tilting which can result therefrom.

Reference may be had to the accompanying Appendix A, together with FIG. 7 in the drawings, for an analysis of a manner in which vibratory translational motions of the supporting structure can become translated into tilting motion of the SMS through the medium of the resilient support means where the center of mass COM of the SMS is offset longitudinally from the plane COE of the center of elasticity for the support system for such SMS.

Referring again to FIGS. 1 to 5, in accordance with the present invention the minimization of tilting of the SMS under influence of translatory vibration of the supporting structure 14 is effectuated by a system of cables and pulleys constructed and arranged such that any motion of one end of the SMS relative to the supporting structure tends to effect a corresponding motion of the opposite end of the SMS relative to such supporting structure, in behalf of avoiding tilting. For example, in FIGS. 1 and 3, as the left end of the SMS, as viewed in the drawing, moves upwardly it tends to cause a corresponding upward movement of the right-hand end of the SMS through the medium of the cable 17 anchored at one end at 18 to the lower left-hand end of the SMS and extending via a system of pulleys through a number of right-angled bends to a point of attachment 24 to the upper right-hand end of such SMS. Similarly, the downward movement of the right-hand end of the SMS tends to cause corresponding downward movement of the left-hand end of the SMS by way of the same cable 17 and arrangement of pulleys 19 and 22. Similarly, a second cable 24, anchored at 25 to the lower right-hand end of the SMS and at its opposite end at 26 to the upper left-hand end of the SMS, tends to equalize vertical motion of these two ends of the SMS in the opposite directions to those handled by cable 17. Cable 24 also is disposed in a vertical plane and extends through a system of pulleys 27, 28, 29, and 30 to direct the cable through its multi-right-angled path. In the FIG. 1 arrangement the cables pass over both ends of the SMS, while in the FIGS. 3, 4 and 5 arrangement the cables 17 and 24 pass over only one end of the SMS. Under different circumstances, one arrangement or the other may be preferable.

A similar arrangement, not shown in FIGS. 1, 3 and 4 is provided to prevent tilting of the SMS in the horizontal direction. Referring to FIG. 5, for example, this involves a pair of cables 32 and 33 passing over an arrangement of pulleys similar to those provided for accommodating the cables 17 and 24 discussed above and extending between anchor points 34 and 35 and 36 and 37 on the SMS, respectively. It will be appreciated that when the right-hand or forward end of the SMS tends to move out of the plane of the drawing as viewed in FIGS. 1 and 3, the cable 32 tends to cause corresponding movement of the left-hand edge of the SMS. When the right-hand or forward end of the SMS tends to move into the plane of the drawing as viewed in FIG. 3, for example, the cable 32 tends to cause corresponding movement of the opposite end of the SMS. From the foregoing it will be apparent that any tendency for the SMS to be tilted either in the horizontal or vertical, or inbetween, the cables 17, 24, 32 and 33 act in behalf of overcoming such tendency.

Figure 9:
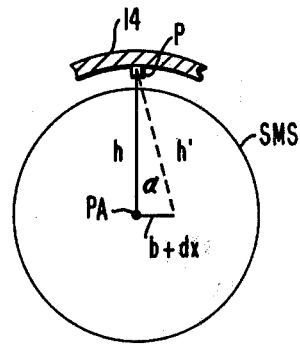
FIG. 9 is a representation illustrating schematically certain cable deflecting characteristics inherent in the anti-tilting cable and pulley system of the present invention.

While the cables 32, 33, for example, passing around their respective pulleys are acting in behalf of preventing tilting of the SMS as above described, it becomes necessary for the other cable pair, 17, 24, for example, to become deflected to some slight extent, between the points of attachment 26 and 25, and 23 and 18 of such cables with the SMS and the pulleys 22, 27, 30, and 19 nearest such support points. The amount of translatory vibratory movement of the supporting structure relative to the SMS is relatively slight, often in the order of ± 1/10 of an inch at most, and at such amplitudes the amount of deflection of one cable set or the other which needs to transpire in order to accommodate such relative vibratory movement between the SMS and supporting structure causes only a relatively insignificant amount of opposition. The amount of angular movement required is relatively slight, and as depicted in FIG. 9 the amount of stretching of the cable required to accommodate such minor angular movement is a function of the cosine of the angle between the support pulley P and the point of attachment PA with the SMS. It will be seen from FIG. 9 that the difference in length of cable lengths H and H' will be relatively slight for narrow angles $a$ involved here. Appendix A includes an analysis of the effect of such cable stretch on the performance of the system.

FIG. 6 shows curves depicting the relationship between the tilt output transfer function imparted to the SMS with and without the cable system of the present invention. The upper transfer function curves in dashed line is for the resiliently supported SMS without the cable system and the lower solid line curve depicts the transfer function for the SMS as including the cable-and-pulley system of the present invention. These curves, it will be noted, however, are based on a mathematical analysis of system performance and are shown here only for purposes of relative comparison.

In FIGS. 3 and 5, the supporting structure 14 includes a cylindrical pod housing 40 for mounting on the exterior of an aircraft. The forward end of such housing 40 will coincide with the input optics end 10 of the SMS and includes a transparent streamlined front cover (not shown).

APPENDIX A

In the curves of FIG. 6, the following symbol identities apply:

$\theta$ = angular tilting of the SMS $\ddot{Y}$ = translational vibratory acceleration of the supporting structure of the SMS $e$ = longitudinal distance between the center of mass (COM) of the SMS and the center of elasticity (COE) of the support system relative to the SMS $\omega_{T_o}$ = natural translatory frequency of the resiliently supported SMS, without the anti-tilt cable and pulley arrangement of the present invention $\omega_T$ = natural translatory frequency of the resiliently supported SMS, with the anti-tilt cable and pulley arrangement of the present invention $\omega_R$ = natural tilting frequency of the resiliently supported SMS with the anti-tilt cable and pulley arrangement of the present invention L = longitudinal dimension of the SMS K = spring constant of resilient support for the SMS A = cross-section area of cable employed in the cable and pulley arrangement of the present invention E = modulus of elasticity of the above cable Referring to FIG. 7, the following mathematical analysis depicts the relationship between tilting, $\theta$, of the SMS and vibratory translational movement, $Y(\omega)$, of the supporting structure 14 for the SMS:

Assume uniformly distributed mass ($m$) along length (L) of SMS except for small anomaly which produces eccentricity ($e$):

$$m\ddot{X} = -K(X_1 - Y) - K(X_2 - Y)$$

$$J\ddot{\theta} = -K(X_1 - Y)(\frac{L}{2} - e) + K(X_2 - Y)(\frac{L}{2} + e)$$

$$m\ddot{X} + 2KX - Ke\theta = 2KY$$

$$J\ddot{\theta} + \frac{KL^2}{2}\theta - 2KeX = -2KeY$$

$$\begin{bmatrix} (mS^2 + 2K) & (-Ke) \\ (-2Ke) & (JS^2 + \frac{KL^2}{2}) \end{bmatrix} \begin{Bmatrix} X \\ \theta \end{Bmatrix} = \begin{Bmatrix} 2KY \\ -2KeY \end{Bmatrix}$$

Solving for the system natural frequencies $$\Delta = (mS^2 + 2K)\left(JS^2 + \frac{KL^2}{2}\right) - 2(Ke)^2 = 0$$

with $S = J$ $$mJ\omega^4 - \left(2KJ + \frac{KL^2}{2}m\right)\omega^2 + K^2(L^2 - 2e^2) = 0$$

$$\omega^2 = \left(\frac{K}{m} + \frac{KL^2}{4J}\right) \pm \sqrt{\left(\frac{K}{m} + \frac{KL^2}{4J}\right)^2 - \frac{2K^2 e^2}{mJ}}$$

For $e$ small $$\omega^2 \approx \left(\frac{K}{m} + \frac{KL^2}{4J}\right) \pm \left(\frac{K}{m} - \frac{KL^2}{4J}\right)$$

$$= \frac{2K}{m}, \frac{KL^2}{2J} \text{ (translational \& rocking modes)}$$

For $M$ uniformly distributed $J = mL^2/12$ $$\therefore \omega^2 = 2K/m, 6K/m \ (\omega_{rotation} = \sqrt{3}\omega_{translation})$$

Inverting the prior matrix equation, $$\begin{Bmatrix} X \\ \theta \end{Bmatrix} = \begin{bmatrix} (JS^2 + KL^2/2) & (Ke) \\ (2Ke) & (mS^2 + 2K) \end{bmatrix} \begin{Bmatrix} 2KY \\ -2KeY \end{Bmatrix} \div$$

$$[(mS^2 + 2K)(JS^2 + KL^2/2) - 2(Ke)^2]$$

Solving for the Amplitude of the rocking motion, $$\theta = (4eY/L^2)(\omega^2/\omega_T^2) \div$$

$$\left[\left(1 - \frac{\omega^2}{\omega_R^2}\right)\left(1 - \frac{\omega^2}{\omega_T^2}\right) - 2e^2/L^2\right]$$

For $m$ uniformly distributed and $e \ll L$, $$\theta \approx \frac{4e\ddot{Y}/L^2\omega_T^2}{\left(1 - \frac{\omega^2}{3\omega_T^2}\right)\left(1 - \frac{\omega^2}{\omega_T^2}\right)}$$

Figure 8:
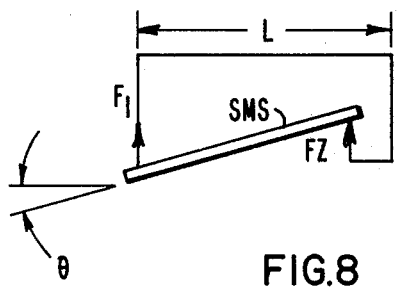

Referring to FIG. 8, if the system of cables is added to the structure, the foregoing analysis is modified by replacing the stiffness terms as follows:

$$F_1 = \frac{L}{2}\theta \cdot \frac{AE}{L/2} = F_2 = AE\theta$$

Tilting Stiffness
Due to Cable $$K_R = T/\theta = F_1 \cdot L/\theta = AEL$$

Note from a prior equation that the stiffness term for tilting motion (arising from the isolators) is $KL^2/2$.

The translational stiffness of a pair of cables being loaded sideways will contribute to the stiffness of the isolators as follows:

Assume body motion as shown in FIG. 9 with a displacement ($b$), followed by increment ($dx$).

The length of cable ($h$) stretches to length $h'$ $$h' = h/\cos\theta$$

$$dh' = h\sin\theta\, d\theta/\cos^2\theta$$

$dh/h' = \tan\theta\, d\theta$

The increment of force on stretched cable is $$dF = AEdE = AE\tan\theta d\theta$$

$$K_T = dF/dx = AE\tan\theta/h$$

$$= \left(\frac{AE}{h}\right) \cdot \frac{b}{h} = \frac{AEb}{h^2}$$

For a pair of cables at each end of the structure, where $K$ = isolator stiffness at each end, $K_1 = \Sigma K = K + 2AEb/h^2$ = revised translational stiffness Rewriting the equation of motion for inclusion of the cable results in $$\begin{Bmatrix} X \\ \theta \end{Bmatrix} = \begin{bmatrix} (JS^2 + K_2) & (K_1 e) \\ (2K_1 e) & (mS^2 + 2K_1) \end{bmatrix} \begin{Bmatrix} 2K_1 Y \\ -2K_1 eY \end{Bmatrix}$$

where
$K_{1i} + K = 2AEb/h^2$
$K_2 = KL^2/2 + AEL$
It follows that $$\theta = \left(\frac{2eK_1 Y}{K_2}\right)\left(\frac{\omega^2}{\omega_T^2}\right) \div \left(1 - \frac{\omega^2}{\omega_R^2}\right)\left(1 - \frac{\omega^2}{\omega_T^2}\right)$$

where $$\omega_T^2 = \frac{2K_1}{m} = \frac{2K + 4AEb/h^2}{m} = \omega_{T_o}^2\left(1 + \frac{2AEb}{Kh^2}\right)$$

$$\omega_R^2 = \frac{K_2}{J} = \left(\frac{KL^2/2 + AEL}{mL^2/12}\right) = 3\omega_{T_o}^2\left(1 + \frac{2AE}{KL}\right)$$

$$K_1/K_2 = (K + 2AEb/h^2)/(KL^2/2 + AEL)$$

$$= \left(\frac{2}{L^2}\right)\frac{(1 + 2AEb/h^2)}{(1 + 2AE/KL)}$$

and $$\therefore \theta = \frac{4e\ddot{Y}}{L^2 \omega_{T_0}^2} \cdot \frac{1}{1 + \frac{2AE}{KL}} \div \left(1 - \frac{\omega^2}{\omega_R^2}\right)\left(1 - \frac{\omega^2}{\omega_T^2}\right)$$

The invention now having been described, what is claimed as new and desired to be secured by Letters Patent is:

1. An anti-tilting resilient support system for airborne optical sensor instruments, comprising:

a supporting structure for mounting on an aircraft, a sensor mounting structure having an input optics portion for observation of optical information along a line of sight, resilient support means interposed between said supporting structure and said sensor mounting structure, a plurality of taut cables anchored at their opposite ends to longitudinally spaced apart points on said sensor mounting structure, and a plurality of pulleys on said supporting structure directing movement of each of said cables along a pathway having four right-angled bends for directing movement of ends of each cable in opposite directions, said cables and pulleys being so constructed and arranged as to oppose longitudinal tilting of said sensor mounting structure relative to said supporting structure.

2. The system of claim 1, wherein said supporting structure is in form of an elongated pod-like housing for mounting on the exterior of the aircraft, and said sensor mounting structure is of elongated cylindrical configuration disposed coaxially in said housing.

3. The system of claim 1, wherein the center of mass of said sensor mounting structure is displaced longitudinally relative to the center of elasticity of the system.

* * * * *